No. 682,118. Patented Sept. 3, 1901.
J. W. SEWELL & D. T. SEGER.
APPARATUS FOR DESTRUCTIVE DISTILLATION OF GARBAGE.
(Application filed Aug. 24, 1900.)
(No Model.) 2 Sheets—Sheet 1.
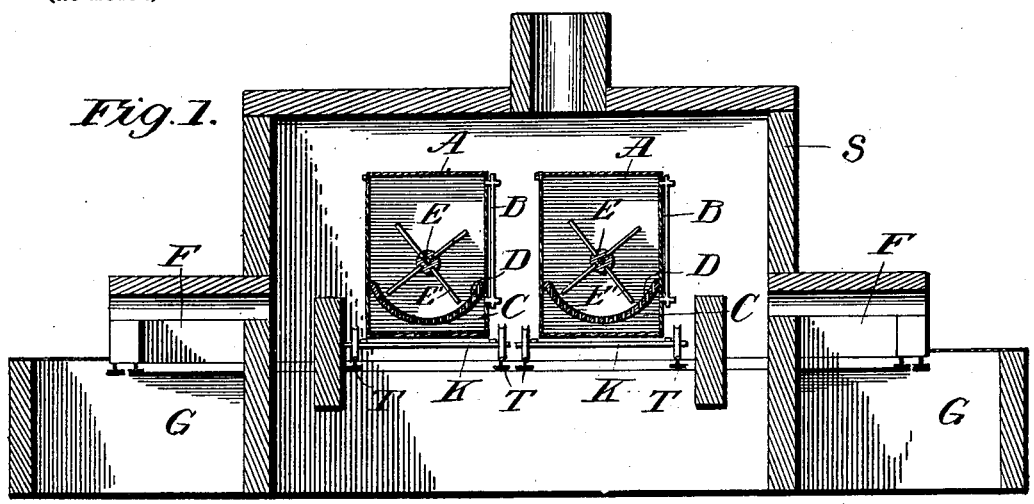
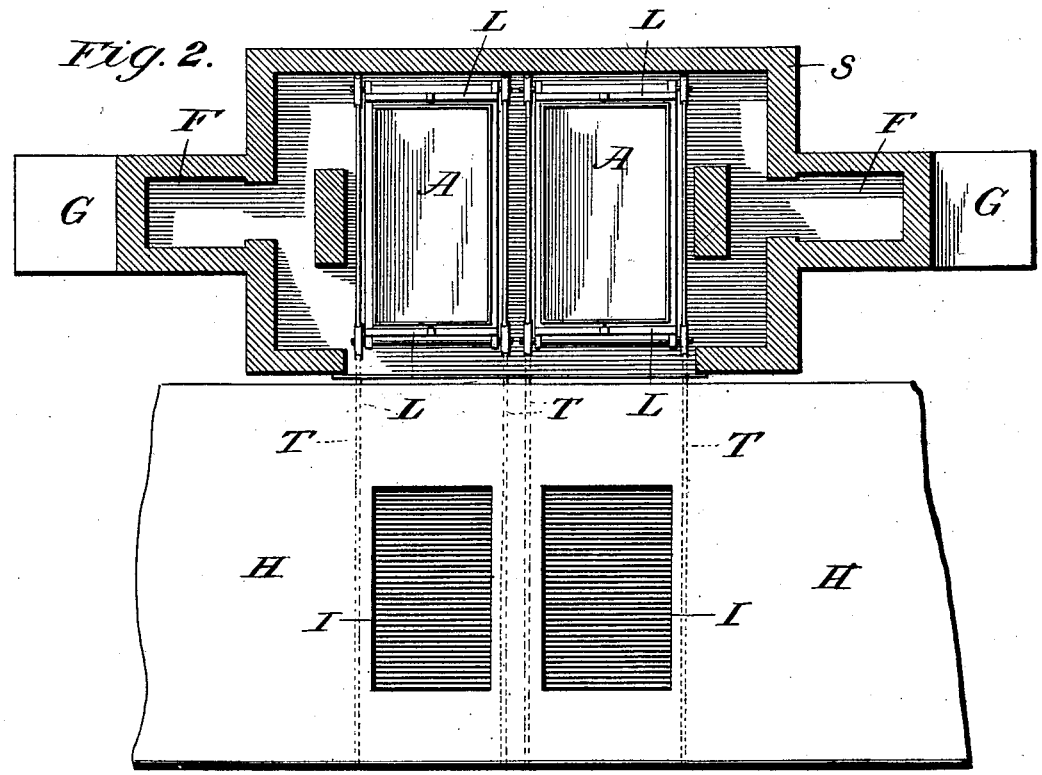

No. 682,118. Patented Sept. 3, 1901.
J. W. SEWELL & D. T. SEGER.
APPARATUS FOR DESTRUCTIVE DISTILLATION OF GARBAGE.
(Application filed Aug. 24, 1900.)
(No Model.) 2 Sheets—Sheet 2.
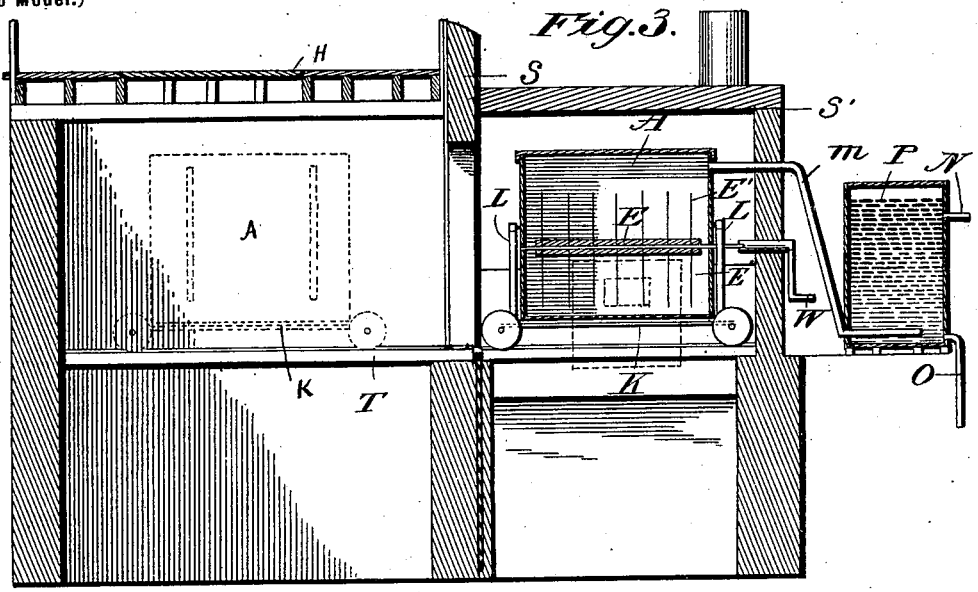
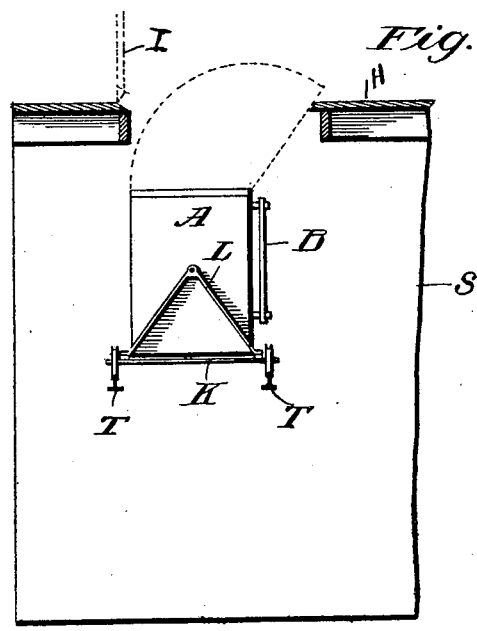
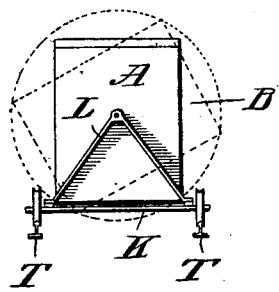

UNITED STATES PATENT OFFICE.

JOHN W. SEWELL AND DANIEL T. SEGER, OF COVINGTON, KENTUCKY, ASSIGNORS OF ONE-HALF TO HENRY F. BLASE AND MICHAEL J. MILLER, OF SAME PLACE.

APPARATUS FOR DESTRUCTIVE DISTILLATION OF GARBAGE.

SPECIFICATION forming part of Letters Patent No. 682,118, dated September 3, 1901.

Application filed August 24, 1900. Serial No. 27,944. (No model.)

*To all whom it may concern:*

Be it known that we, JOHN W. SEWELL and DANIEL T. SEGER, citizens of the United States, residing at Covington, in the county of Kenton and State of Kentucky, have invented certain new and useful Improvements in Apparatus for the Destructive Distillation of Garbage; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for the destructive distillation of garbage, and especially to an odorless soil and garbage apparatus in which the fumes arising from the garbage during the progress of the destructive distillation thereof instead of escaping directly into the atmosphere are conducted through a tank of water, in which the gases are absorbed by the water.

Our invention will be hereinafter more fully described and then specifically defined in the appended claims, and is illustrated in the accompanying drawings, which, with the letters of reference marked thereon, form a part of this application, and in which similar letters of reference indicate like parts, in which—

Figure 1 is a vertical sectional view through our apparatus and the garbage-receptacles therein. Fig. 2 is a horizontal sectional view through the apparatus, parts being shown in top plan view. Fig. 3 is a vertical sectional view longitudinally through the apparatus and garbage tank and truck and water-tank. Fig. 4 is a vertical sectional view through the driving-platform, showing a garbage-receptacle located underneath an open trap-door. Fig. 5 is an end elevation of one of the garbage-receptacles mounted on a truck.

Reference now being had to the details of the drawings by letter, S designates the wall or inclosure of the chamber, in which are mounted tracks T, on which the trucks K are mounted. On said trucks are located the garbage-receptacles A, each having a concaved grate-bottom D, provided for the purpose of allowing the garbage moisture to drip through and be caught in the portion C, which is a drip-pan. Communicating between said drip-pan C and the upper portion of each receptacle is a pipe B, through which the steam arising from the drip-pan may enter the upper portion of the receptacle before passing into the water-tank. Mounted in each receptacle is a stirrer-shaft E, having arms E' radiating therefrom, whereby the garbage may be agitated while the destructive distillation of the garbage is in progress. On either side of the chamber are furnaces F, and underneath the latter are ash-pits G. A driving-platform H is adjacent to but slightly above the firing-chamber, and trap-doors I in said platform are provided, which may be opened for the purpose of allowing the garbage to be dumped through the trap-opening and into the garbage-receptacle which has been pushed underneath said opening. The tracks T extend outside of the firing-chamber and underneath the platform, as shown clearly in Fig. 3 of the drawings.

Passing through the wall S', Fig. 3, is a pipe *m*, the inner end of which is designed to be connected with a pipe leading away from the upper portion of the receptacle when the receptacle is in the firing-chamber. This pipe *m* leads to and into a water-tank P, having an outlet-pipe O and an inlet-pipe N. Lower down in said wall S' is mounted a crank W, having a hollow end, which is adapted to receive the end of the stirrer-shaft, whereby the latter may be operated as the destructive distillation of the garbage progresses.

For convenience in dumping the refuse in the garbage-receptacles after being fired the shaft E is journaled in the upright supports L and the receptacle may be tilted, as shown in Fig. 5 of the drawings.

In operation our apparatus is simple. The garbage, being first dumped through the trap-door openings, falls into the garbage-receptacles underneath, after which the receptacles are pushed into the furnace or firing-chamber and the connections made with the pipe *m* and the crank W, and the doors of the firing-chamber being closed and the fire started the garbage is cremated within said receptacles, and the fumes will pass away from the receptacles through the pipe $m$ into the water-tank, in which the obnoxious fumes are absorbed or mechanically mixed by the current of water passing through the tank and through the outlet-pipe O, while fresh water enters through the pipe N.

Having thus described our invention, what we claim to be new, and desire to secure by Letters Patent, is—

1. In an apparatus for the destructive distillation of garbage, the firing-chamber, the truck mounted on tracks therein, the garbage-receptacle mounted on said truck, rotary stirrers journaled in the ends of the receptacle, a crank-shaft mounted in the wall of the firing-chamber and having connections with the stirrer-shaft, and the tank of water outside the chamber and having pipe connections with the receptacle, as set forth.

2. In an apparatus for the destructive distillation of garbage, the firing-chamber and furnaces, the garbage-receptacle, the truck on which said receptacle is mounted and arranged to tilt, the grate in the lower portion of the receptacle and the drip-pan beneath said grate, and the water-tank outside the firing-chamber, having communication through the wall with the receptacle, and the crank journaled in the wall of the chamber and connected with the stirrer-shaft in the receptacle as set forth.

3. In combination with the receptacle mounted as described, the curved grate in the lower portion of the receptacle, the drip-pan beneath said grate, a pipe outside the receptacle affording communication between the upper end of the latter and the drip-pan, the water-tank outside the firing-chamber, a pipe affording communication between the tank and the receptacle, and the agitator-shaft and crank mounted as described for operating said shaft, as set forth.

In testimony whereof we affix our signatures in presence of two witnesses.

JOHN W. SEWELL.
DANIEL T. SEGER.

Witnesses:
CHARLES H. POHLMAN,
JOHN T. SHEEHAN.